United States Patent [19]

Esaki et al.

[11] Patent Number: 5,613,991
[45] Date of Patent: Mar. 25, 1997

[54] AIR FILTER ATTACHMENT AND DETACHMENT STRUCTURE IN AIR CONDITIONING DEVICE FOR MOTOR VEHICLE

[75] Inventors: Hidenori Esaki; Yoshihiro Watanabe, both of Saitama, Japan

[73] Assignee: Honda Giken Kogyo Kabushiki Kaisha, Tokyo, Japan

[21] Appl. No.: 450,971

[22] Filed: May 25, 1995

[30] Foreign Application Priority Data

May 25, 1994 [JP] Japan .................................. 6-110958

[51] Int. Cl.⁶ ................................................ B01D 46/10
[52] U.S. Cl. .......................... 55/385.3; 55/481; 55/506; 454/158
[58] Field of Search .................. 55/385.3, 481, 55/480, 478, 506, 503, 504; 454/158, 156

[56] References Cited

U.S. PATENT DOCUMENTS

| | | | |
|---|---|---|---|
| 2,319,035 | 5/1943 | Breese | 454/158 |
| 4,319,519 | 3/1982 | Parsson | 454/158 |
| 4,925,468 | 5/1990 | Kishi et al. | 55/481 |
| 5,062,353 | 11/1991 | Arold et al. | 454/158 |
| 5,221,292 | 6/1993 | Aoyama | 55/270 |
| 5,494,497 | 2/1996 | Lee | 55/385.3 |

FOREIGN PATENT DOCUMENTS

| | | | |
|---|---|---|---|
| 0608034 | 7/1994 | European Pat. Off. | 454/158 |
| 2845490 | 4/1980 | Germany | 454/158 |
| 3924676 | 1/1991 | Germany | 454/158 |
| 404501 | 8/1991 | Germany . | |
| 4419626 | 1/1995 | Germany | 454/158 |

OTHER PUBLICATIONS

English language Abstract of JP 4271916, Feb. 8, 1993.

*Primary Examiner*—Jay H. Woo
*Assistant Examiner*—Duane S. Smith
*Attorney, Agent, or Firm*—Lyon & Lyon

[57] ABSTRACT

In an air conditioning device having an air passage device that extends inside an instrument panel in a lateral direction of the body of a motor vehicle, the air passage device has a substantially L-shaped slit for attachment and detachment of an air filter, the slit being formed of a first slit opening downwardly and a second slit opening rearwardly of the vehicle body and a gap is provided between the second slit and a front end portion of a glove box. This permits the air filter of a square plate shape to be attached to and detached from the slit without interfering with the glove box, while being rotated slightly along the floor and toe board of the passenger compartment.

7 Claims, 9 Drawing Sheets

AIR FILTER ATTACHMENT AND DETACHMENT STRUCTURE IN AIR CONDITIONING DEVICE FOR MOTOR VEHICLE

BACKGROUND OF THE INVENTION

1. Field of the Invention

The field of the present invention is air filter attachment and detachment structures in air conditioning devices used for a motor vehicle, wherein the air conditioning device has an air passage means that is disposed inside an instrument panel having a glove box opposed to a compartment of the motor vehicle, the air passage means being located forwardly of the glove box in a vehicle body of the motor vehicle and extending laterally of the vehicle body, and wherein an air filter of a square plate shape is attached to and detached from the air passage means through an air filter attachment and detachment slit provided in the air passage means.

2. Description of the Prior Art

An air filter provided in an air passage means of an air conditioning device for a motor vehicle has an element made of electrified fiber material and operates to purify the air, that is being introduced into the compartment, by causing dust in the air to be absorbed onto the element with the function of static electricity.

The air passage means of such air conditioning device is, however, disposed generally at a lower portion of an instrument panel that is located forwardly of an assistant driver's seat in the vehicle body and a glove box is mounted on a side of the air passage means close to the compartment. Therefore, the replacement of the air filter must be conducted from below the instrument panel so as not to interfere with the glove box. The distance between the lower surface of the instrument panel and the floor is, however, small and moreover, a toe board is provided continuously from the floor so as to rise upwardly at a forward inclination relative to the floor, so that it is difficult to attach and detach the air filter from below the instrument panel without any special contrivance.

It has, therefore, been proposed conventionally to construct the air filter into a one $01$ that is foldable at a plurality of hinge means $01_1$, as shown in FIGS. 9 and 10. This air filter $01$ is attached to and detached from an air filter attachment and detachment slit $06_1$ formed at a lower surface of air passage means $06$ inside an instrument panel $05$ while being passed through a space defined among a glove box $02$, a floor $03$ and a toe board $04$.

As another countermeasure, as shown in FIG. 11, an air filter $01$ having notches $01_2$, $01_3$, $01_4$ formed at its outer periphery has been proposed and this air filter $01$ is attached to and detached from an air filter attachment and detachment slit $06_1$ provided at a lower surface of air passage means $06$ while being rotated.

In the case of the first mentioned conventional measure, however, the provision of a plurality of hinge means $01_1$ not only makes the structure complicated and raises the production cost but also reduces the effective area of the said element of the air filter $01$, leading to an increase in resistance against the air passage and a reduction in the dust trapping and collecting effect.

In the latter measure, the provision of the notches $01_2$, $01_3$, $01_4$ reduces the effective area of the element of the air filter $01$ thereby to increase the resistance against the air passage and lower the trapping effect but also reduces the yield for the element of the air filter $01$ at the time of manufacturing. Moreover, in both the measures, it is difficult to visually recognize the air filter attachment and detachment slit $06_1$ of the air passage means $06$ from the side of the compartment so that there is a problem in the efficiency in performing the attaching and detaching operation of the air filter $01$.

The present invention has been proposed in view of these circumstances and an object thereof is to facilitate the operation of attaching and detaching an air filter of a square plate shape to and from a slit formed at an air passage means of an air conditioning device.

SUMMARY OF THE INVENTION

In order to achieve the above object, the invention provides an air filter attachment and detachment structure in an air conditioning device for a motor vehicle, wherein said air conditioning device has an air passage means that is disposed inside an instrument panel having a glove box opposed to a passenger compartment of the motor vehicle, said air passage means being located forwardly of said glove box in a vehicle body of said motor vehicle and extending laterally of the vehicle body, and wherein an air filter of a square plate shape is attached to and detached from said air passage means through an air filter attachment and detachment slit provided in said air passage means, said air filter attachment and detachment slit being formed into a substantially L-shape having a first slit opening downwardly and a second slit opening rearwardly of said vehicle body, said first and second slits being connected to each other, a predetermined gap being provided between said second slit and a front end portion of said glove box.

With the above arrangement, even when the air filter is simply formed into a square plate shape for the purpose of reducing the production cost and enhancing the dust trapping effect, the air filter can still easily be attached and detached without interfering with the glove box. Furthermore, since the second slit which opens rearwardly of the vehicle body can be recognized visually from the compartment side, the replacement of the air filter with a new one can be done easily while visually confirming the position of the air filter attachment and detachment slit.

The above and other objects, features and advantages according to the invention will be apparent from reading of the following detailed description of preferred embodiments in conjunction with the accompanying drawings.

DETAILED DESCRIPTION OF PREFERRED EMBODIMENTS

Some embodiments according to the present invention will be described hereinafter with reference to the accompanying drawings.

Figure 1:
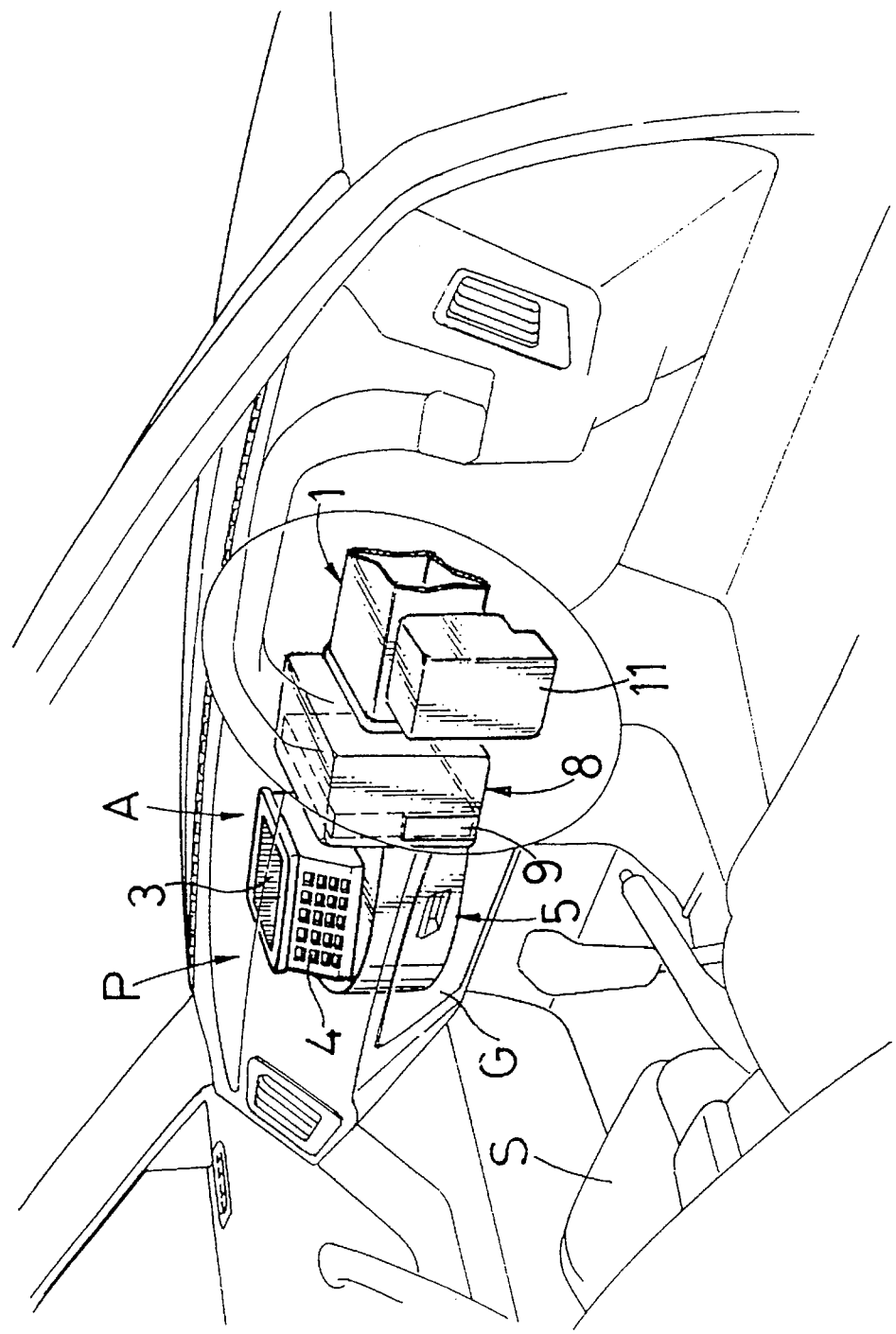
FIG. 1 is a perspective view showing the state of an air conditioning device mounted at an instrument panel, according to a first embodiment of the invention.
Figure 2:
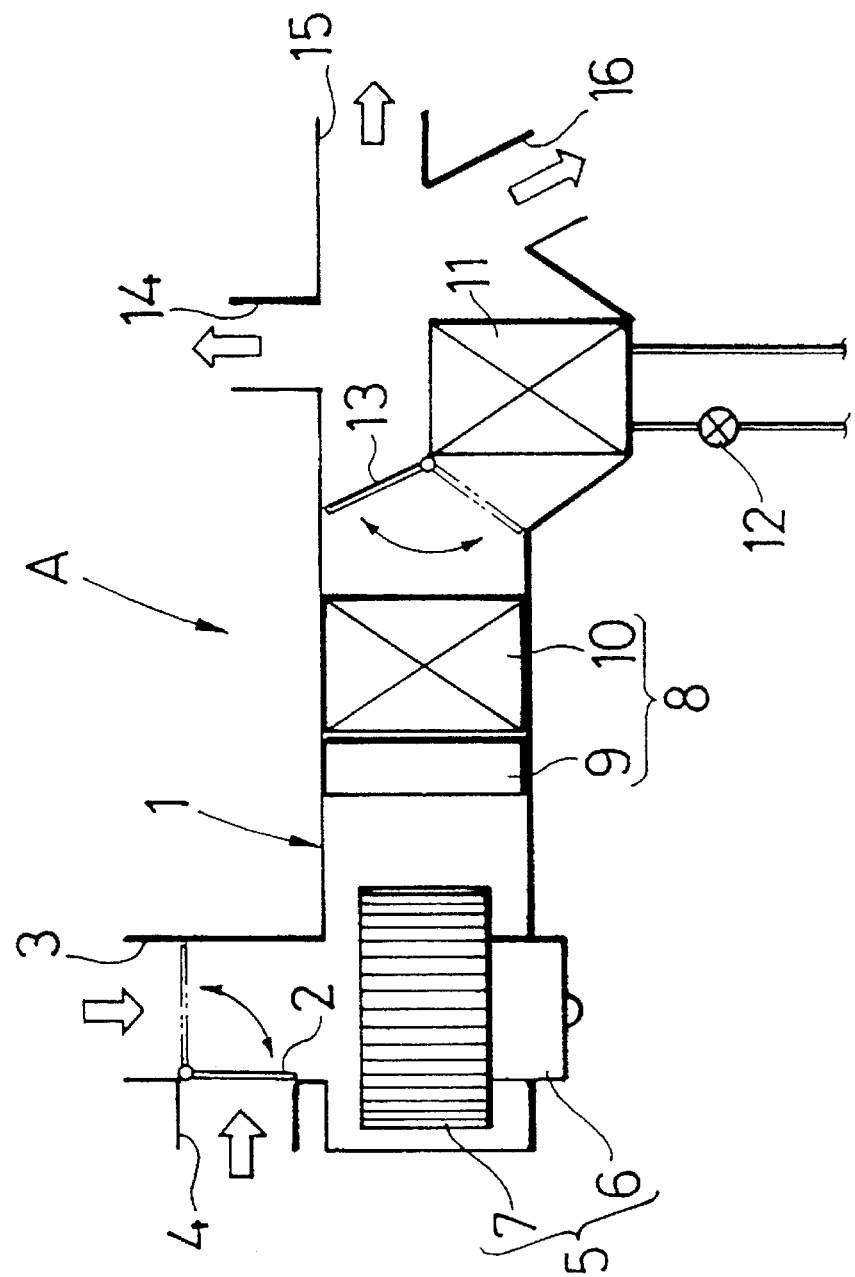
FIG. 2 is a view showing a diagrammatic structure of the air conditioning device.
Figure 3:
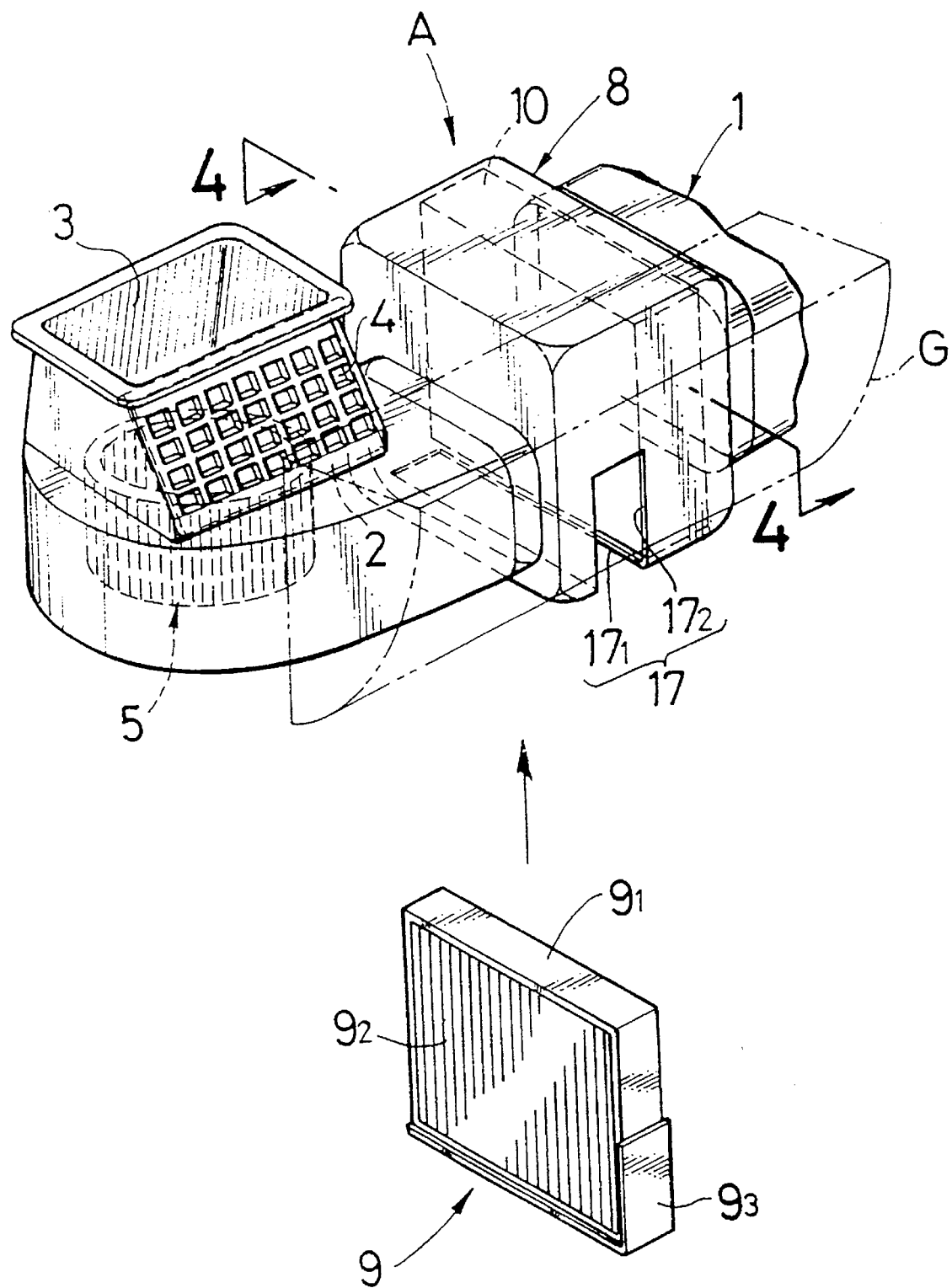
FIG. 3 is a perspective view of an essential portion of the air conditioning device.

FIGS. 1 to 5 show a first embodiment according to the present invention. As shown in FIGS. 1 to 3, an air conditioning device A of a motor vehicle has its essential portion accommodated inside an instrument panel P which is disposed forwardly of an assistant driver's seat S (a left side seat in this embodiment). A glove box G is provided on a side of the instrument panel P that faces or is opposed to the compartment.

The air conditioning device A comprises an air passage means 1 extending laterally or from left to right within the instrument panel P and there are provided at an upstream end or left end of the air passage means 1 an outside air introduction port 3 for introducing air from outside the compartment and an inside air introduction port 4 for introducing air from inside the compartment which are selectively opened by an intake dumper 2. A blower 5 is provided at a location downstream of the intake damper 2 and comprises a motor 6 and a fan 7. The blower 5 operates to feed under pressure the air, that has been taken in through the outside air introduction port 3 or the inside air introduction port 4, toward a cooling unit 8 to be described later.

The cooling unit 8 comprises an air filter 9 on the upstream side and an evaporator 10 on the downstream side. The air filter 9 has an element $9_2$ of electrified fiber material assembled inside a frame member $9_1$ of a rectangle shape and the element $9_2$ acts, with the function of static electricity, to adsorb and eliminate dust in the air flowing in the passage means 1.

Refrigerant in a mist condition of a low temperature and a low pressure is supplied to the evaporator 10 through a compressor, condenser, liquid tank and an expansion valve, which are not shown, to cool the air passing through the air passage means 1.

A heater core 11 is provided at a location downstream of the cooling unit 8 and supplied with water for cooling an engine through a water valve 12. The heater core 11 is disposed in the air passage means 1 so as to interrupt or cover a part of the sectional area of the passage and by adjusting the angle of an air mix damper 13 swung within the passage means whereby the ratio of air passing the heater core 11 and air not passing the core 11 can be changed in a desired fashion. At locations in the air passage means 1 downstream of the heater core 11, a DEF discharge port 14, a VENT discharge port 15 and a HEAT discharge port 16 are provided so as to be open to proper portions within the compartment.

Figure 4:
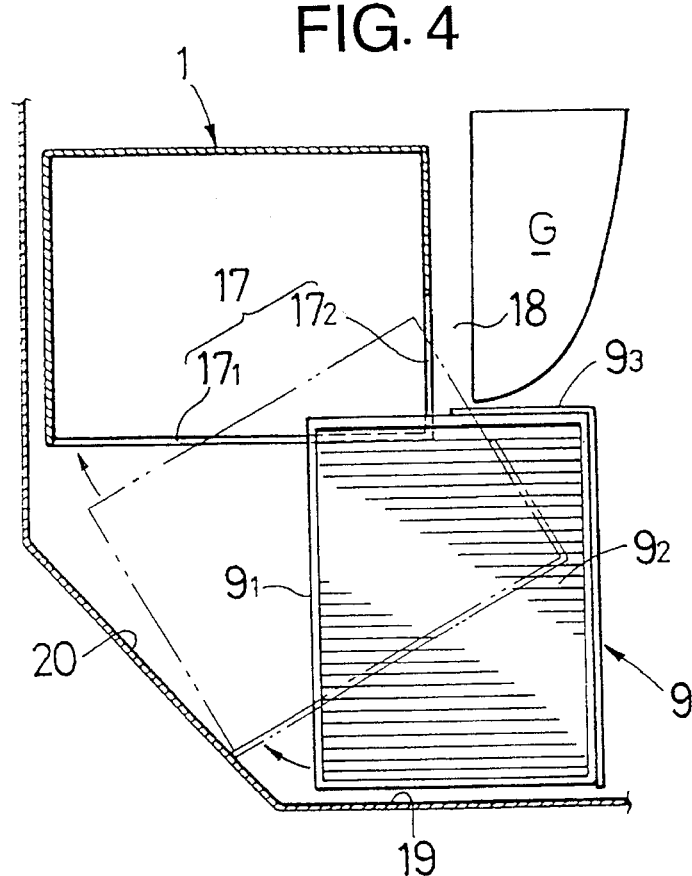
FIG. 4 is a sectional view taken on line 4—4 of FIG. 3 for explaining the operation of the first embodiment.

As apparent from FIGS. 3 and 4, on a portion of the air passage means 1 having a rectangle cross section to which the air filter 9 is to be mounted, there are provided a first slit $17_1$ opening downwardly and extending longitudinally of the vehicle body, and a second slit $17_2$ which opens rearwardly (toward the compartment) and extends vertically. The rear end of the first slit $17_1$ and the lower end of the second slit $17_2$ are connected to each other and those slits cooperatively define an air filter attachment and detachment slit 17 of an L-shape. When the air filter 9 is mounted to the air filter attachment and detachment slit 17, an L-shaped cover member $9_3$ formed on the frame member $9_1$ of air filter 9 is fitted to the slit 17 without any gap left therebetween.

A predetermined or selected gap 18 is formed between the second slit $17_2$ and a front end portion of the glove box G and is of at least a predetermined width for avoiding interference between the air filter 9 and the glove box G at the time of attaching and detaching the air filter 9 to and from the slit 17.

The operation of the above embodiment according to the invention now will be described below.

The outside air which has been introduced from the outside air introduction port 3 or the inside air which has been introduced from the inside air introduction port 4 by means of the blower 5 is fed inside the air passage means 1 toward the cooling unit 8 and, after having eliminated the dust therefrom by flowing through the air filter 9, the air is further passed through the evaporator 10 for dehumidification and cooling. The air mix dumper 13 is swung to a predetermined position between a solid line position and a dotted line position shown in FIG. 2 dependent on a selected air conditioning mode, that is, cooling mode, heating mode, antifogging mode or the like, whereby the air having passed the evaporator 10 only and thereby having been dehumidified and cooled and the air having passed the evaporator 10 and then passed the heater core 11 and heated up are mixed with each other at a predetermined ratio. The mixed air is discharged from a predetermined one of DEF port 14, VENT port 15 and HEAT port 16 into the compartment.

The air filter 9 which has been contaminated by the operations of the air conditioning device A is replaced with a new one by utilizing the above-mentioned air filter attachment and detachment slit 17 provided in the air passage means 1. In the process of attaching the air filter 9 to the air filter attachment and detachment slit 17, as shown in FIG. 4, it is only required that the air filter 9 of a rectangle plate shape be held with its longer side standing vertically and, in this state, inserted into a place between the floor 19 and the glove box G and thereafter, the lower edge of the air filter 9 be rotated or pushed upwardly along the toe board 20. With these steps, the air filter 9 comes into fitment at its cover member $9_3$ with the first slit $17_1$ in a direction from the lower surface of the air passage means 1 and also with the second slit $17_2$ through the gap or spacing 18 between the front end portion of glove box G and the rear surface of air passage means 1, whereby finally the air filter 9 is attached inside the air passage means 1 with its longer side laid horizontally. The detachment of the air filter 9 can be conducted in an order reversed to the just mentioned order.

Figure 5:
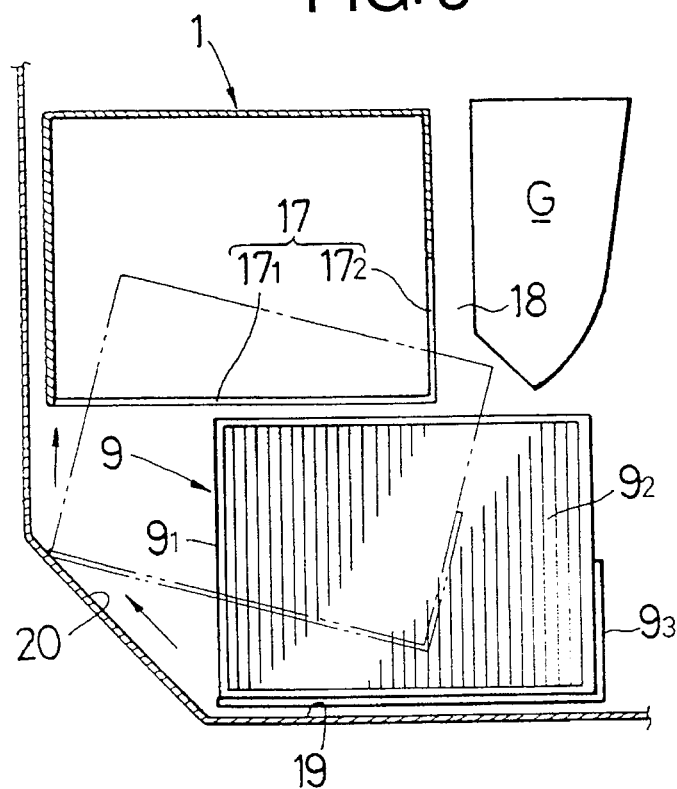
FIG. 5 is an explanatory sectional view similar to FIG. 4 for showing operation of a modified form of the first embodiment.

In addition, if the gap 18 is enlarged at a lower portion thereof toward the glove box G, as shown in FIG. 5, the air filter 9 can be attached to and detached from the slit 17 very easily by holding the filter 9 in a horizontally laid-down state but with its front side lifted up slightly.

As has been described above, since the air filter attachment and detachment slit 17 provided in the air passage means 1 is formed into an L-shape having a first slit $17_1$ and a second slit $17_2$ and a gap 18 is formed between the second slit $17_2$ and the front end portion of glove box G, the air filter 9 can have the simplest, rectangular shape for obtaining the reduction in the production cost and the enhancement in the dust trapping effect while assuring an easy handling of the air filter 9 in attaching and detaching operations. Furthermore, the second slit $17_2$ of the slit 17 is opened toward the compartment side and thus can be recognized visually so that the efficiency in the replacement work of the air filter 9 can be enhanced by easily confirming the position of the air filter attachment and detachment slit 17 visually.

The present invention has been described above in detail by referring to one embodiment. The invention should, however, not be limited thereto but can be modified in various ways in design.

Though the air filter 9 is mounted in the cooling unit 8 in the above-described first embodiment, the air filter 9 can instead be attached to any other appropriate portion in the air passage means 1, for example.

Figure 6:
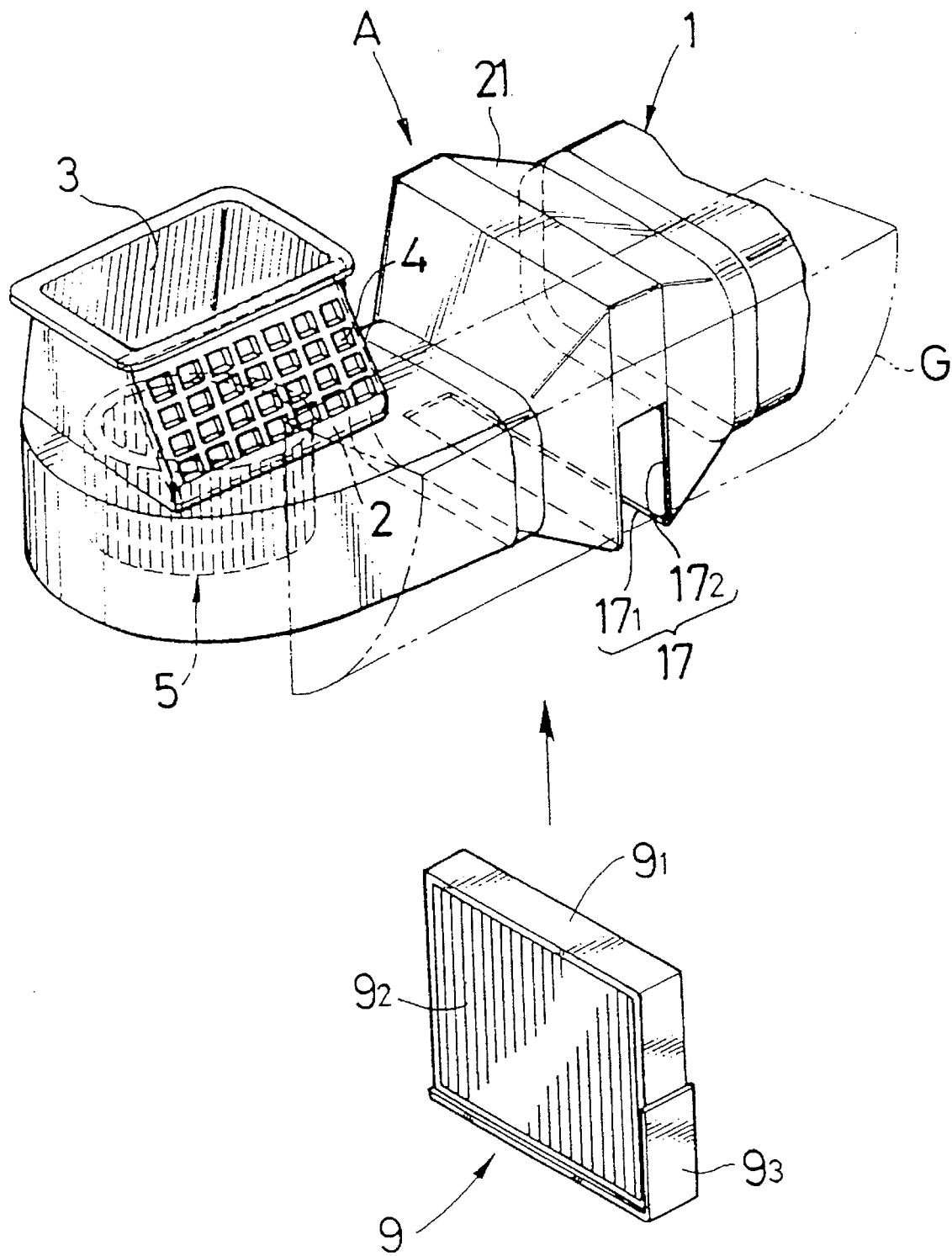
FIG. 6 is a view corresponding to FIG. 3 but showing a second embodiment.

More specifically, in case of a second embodiment shown in FIG. 6, an air filter attachment and detachment slit 17 of an identical structure to that of the first embodiment is formed in a heater duct 21 and the air filter 9 is attached to and detached from this slit 17.

Figure 7:
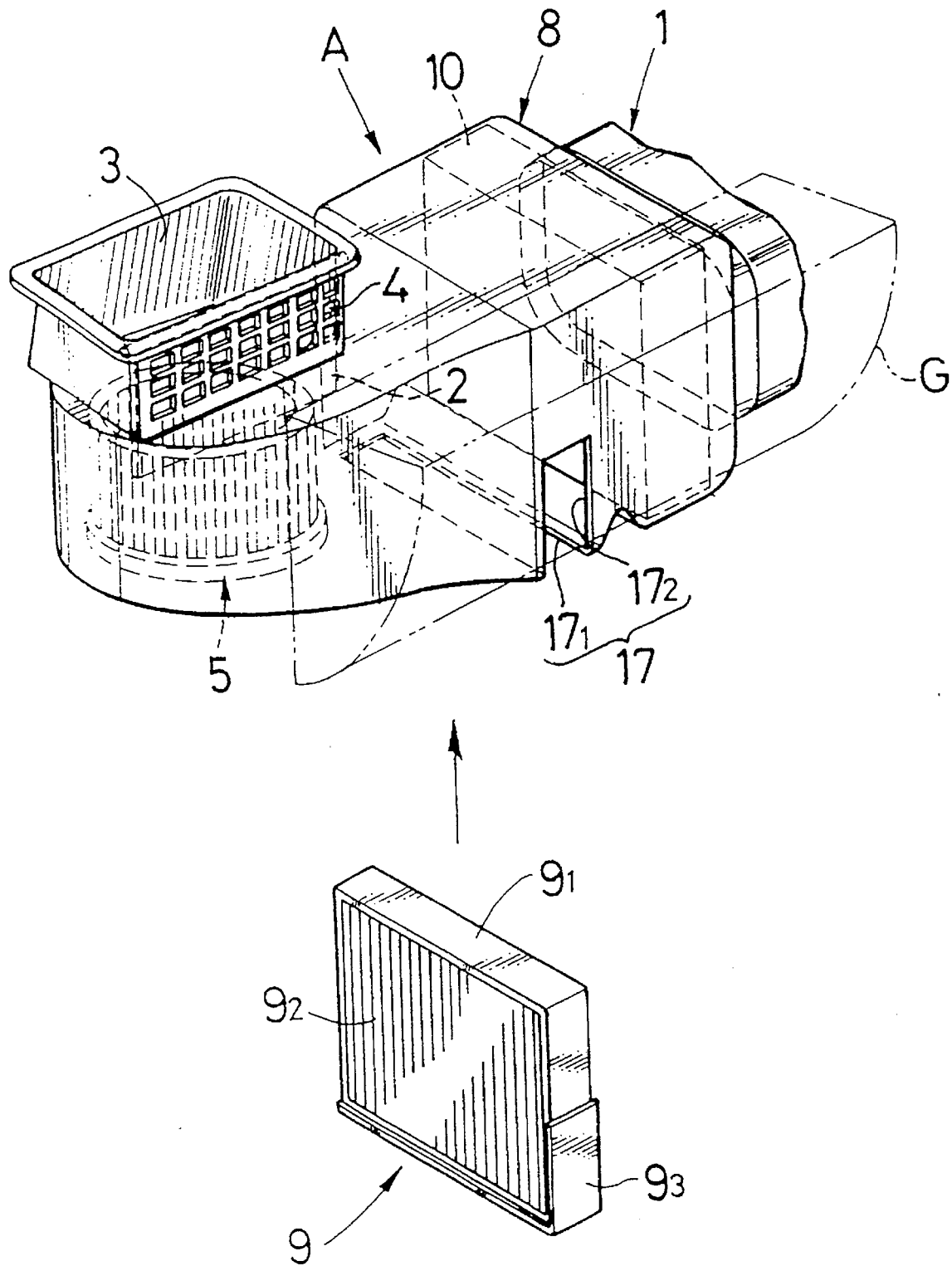
FIG. 7 is a view corresponding to FIG. 3 but showing a third embodiment.

In a third embodiment shown in FIG. 7, an air filter attachment and detachment slit 17 is formed at an outlet of the blower 5 which is located at a portion upstream of the cooling unit 8.

Figure 8:
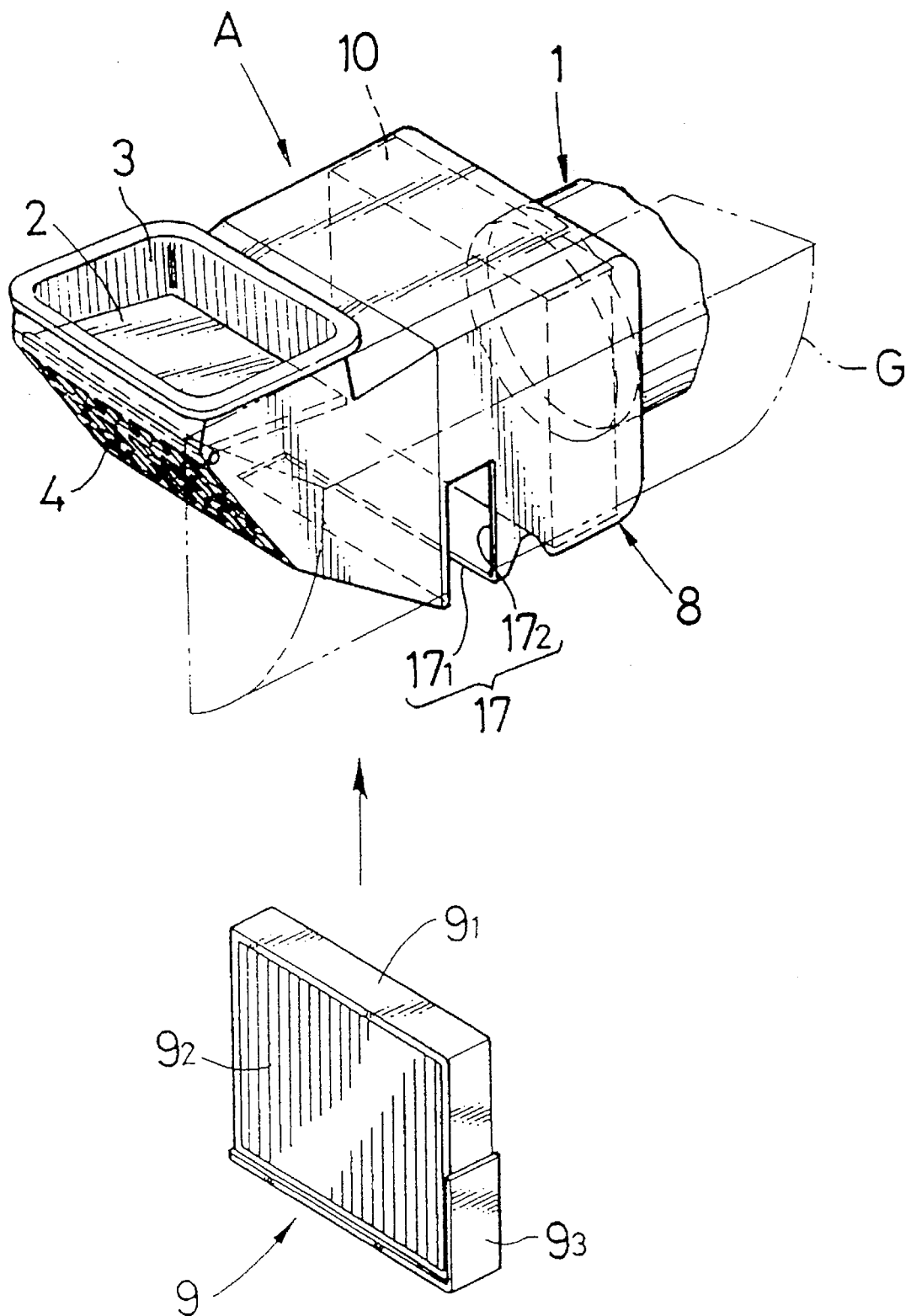
FIG. 8 is a view corresponding to FIG. 3 but showing a fourth embodiment.
Figure 9:
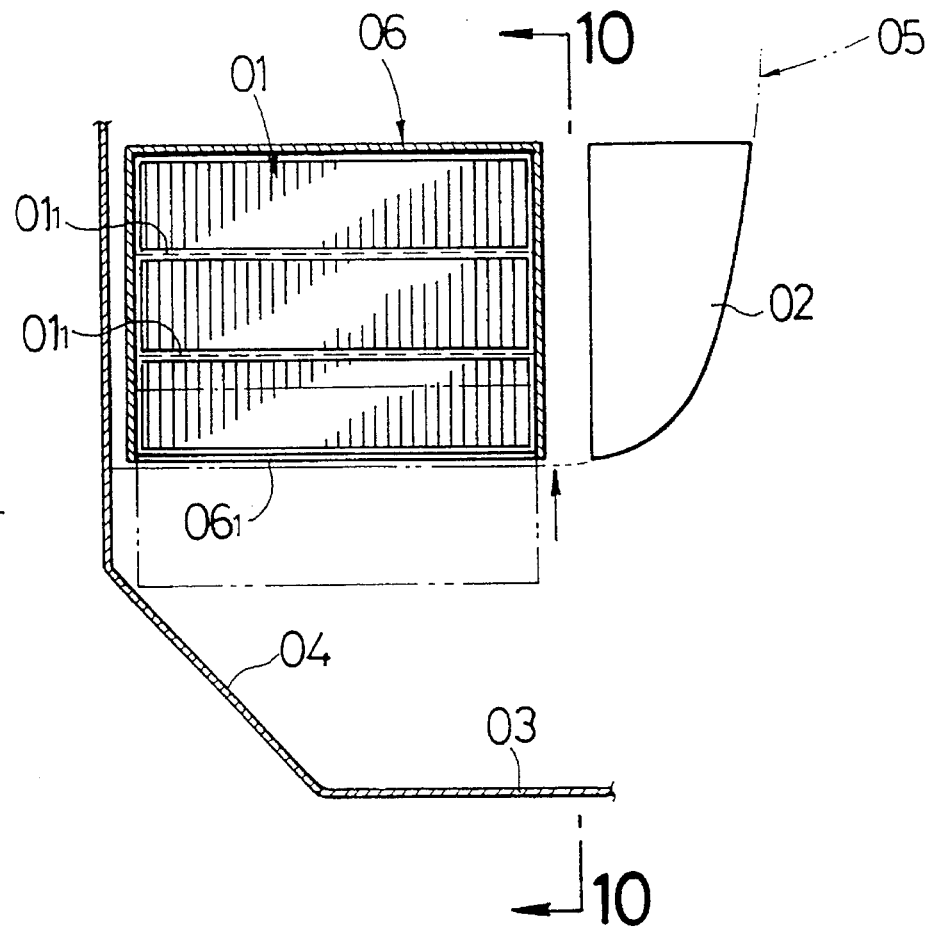
FIG. 9 is a view corresponding to FIG. 4 but showing a prior art conventional air filter attachment and detachment structure.
Figure 10:
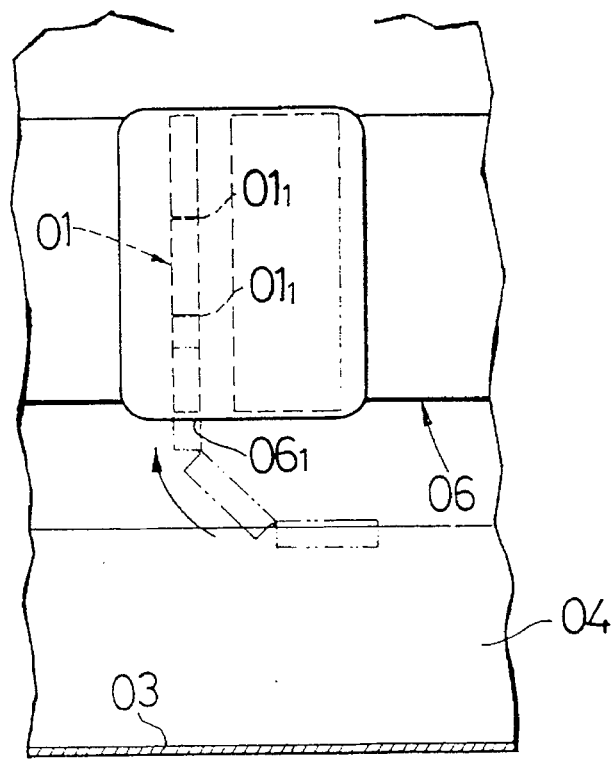
FIG. 10 is a view seen in the direction of arrows 10—10 of FIG. 9.
Figure 11:
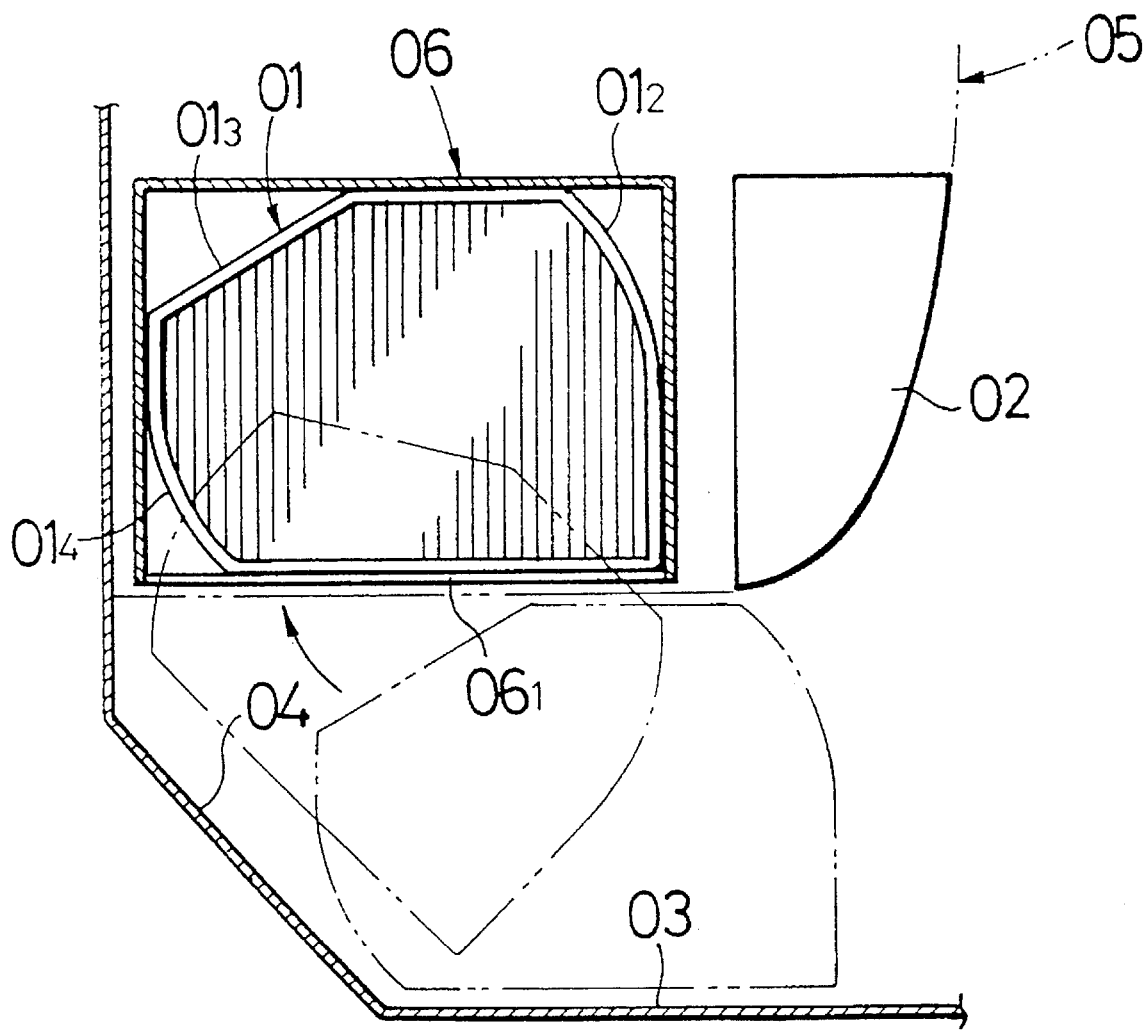
FIG. 11 is a view corresponding to FIG. 4 but showing another prior art conventional air filter attachment and detachment structure.

A fourth embodiment of FIG. 8 has an air filter attachment and detachment slit 17 formed in the air passage means 1 at a location directly downstream of the outside air introduction port 3 and inside air introduction port 4.

Incidentally, it should be noted that the air filter 9 is not limited to ones of rectangle shape but may be of other four-sided shapes such as a regular square.

Furthermore, the invention is naturally applicable to a case wherein the assistant driver's seat is located on the right side in the motor vehicle.

What is claimed is:

1. An air filter attachment and detachment structure in an air conditioning device for a motor vehicle, wherein said air conditioning device has an air passage means that is disposed inside an instrument panel having a glove box opposed to a passenger compartment of the motor vehicle, said air passage means being located forwardly of said glove box in a vehicle body of said motor vehicle and extending laterally of the vehicle body, and wherein an air filter of a square plate shape is attached to and detached from said air passage means through an air filter attachment and detachment slit provided in said air passage means, said air filter attachment and detachment slit being formed into a substantially L-shape having a first slit opening downwardly and a second slit opening rearwardly of said vehicle body, said first and second slits being connected to each other, a selected gap in a horizontal direction being provided between said second slit and a front end portion of said glove box for avoiding interference of the glove box with said air filter at the time of the attachment and detachment operations of the air filter.

2. The structure according to claim 1, wherein said air filter has a cover member of a substantially L-shape to be fitted in said air filter attachment and detachment slit without a gap left therebetween.

3. The structure according to claim 1, wherein said first slit of the air filter attachment and detachment slit is located slightly lower than a lower edge of said glove box.

4. The structure according to claim 3, wherein a space for the attachment and detachment operations of said air filter is provided below said glove box and said air passage means.

5. The structure according to claim 1, wherein said selected gap is of at least a predetermined width for such avoiding of interference of the glove box.

6. The structure according to claim 1, wherein said square plate filter is of size and the glove box is spaced from a floor of the vehicle body such that said filter must be attached to and detached from said air passage means simultaneously through both said first slit and said second slit.

7. The structure according to claim 1, wherein said air passage means is fixedly mounted in said vehicle body and remains fixed during attaching and detaching of said filter.

* * * * *